(12) United States Patent
Kitano

(10) Patent No.: US 7,209,856 B2
(45) Date of Patent: Apr. 24, 2007

(54) METHOD FOR DETECTING DECOMPRESSION OF TIRES AND DEVICE THEREOF, AND PROGRAM FOR JUDGING DECOMPRESSION OF TIRES

(75) Inventor: Masashi Kitano, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/020,303

(22) Filed: Dec. 27, 2004

(65) Prior Publication Data

US 2005/0156721 A1    Jul. 21, 2005

(30) Foreign Application Priority Data

Jan. 21, 2004   (JP) .............................. 2004-012810

(51) Int. Cl.
*G06F 15/00* (2006.01)
*G01P 3/00* (2006.01)

(52) U.S. Cl. ...................... 702/140; 340/442; 340/443; 702/145; 702/148

(58) Field of Classification Search ........ 702/140–142, 702/146, 145, 148; 340/442, 443, 444; 701/29, 701/35, 36; 73/146
See application file for complete search history.

(56) References Cited

U.S. PATENT DOCUMENTS 6,420,966 B2 * 7/2002 Sugisawa .................... 340/442
6,788,191 B2 * 9/2004 Kawasaki et al. .......... 340/443

FOREIGN PATENT DOCUMENTS

| JP | 7-40717 A | 2/1995 |
|----|-----------|--------|
| JP | 9-203679 A | 8/1997 |
| JP | 9-207528 A | 8/1997 |
| JP | 2002-19435 A | 1/2002 |
| JP | 2003-260910 A | 9/2003 |

* cited by examiner

*Primary Examiner*—Bryan Bui
*Assistant Examiner*—John Le
(74) *Attorney, Agent, or Firm*—Birch, Stewart, Kolasch & Birch, LLP

(57) ABSTRACT

A detection method of reducing the air pressure of tires based on the rotational speed of wheels mounted on a vehicle. The method includes steps of: detecting the rotational speed of each of the wheels; storing the rotational speed of wheels; determining a judgment value of decompression of tires based on the relative comparison of the rotational speed; storing the judgment value in a non-volatile memory; determining an average value obtained by a moving average of a certain number of the judgment value; and judging decompression of tires by comparing the average value with a threshold. Decompression of tires can be detected even if the traveling of a vehicle is repeated for a short time and the chance of judging the reduced pressure of tires is magnified to be able to enhance the safety of vehicle traveling.

9 Claims, 2 Drawing Sheets

METHOD FOR DETECTING DECOMPRESSION OF TIRES AND DEVICE THEREOF, AND PROGRAM FOR JUDGING DECOMPRESSION OF TIRES

BACKGROUND OF THE INVENTION

The present invention relates to a method for detecting decompression of tires and a device thereof, and a program for judging decompression of tires. More particularly, the present invention relates to a method for detecting decompression of tires which can detect decompression of tires even if the traveling and stoppage of a vehicle are repeated for a short time and a device thereof, and a program for judging decompression of tires.

A detection device of decompression of tires has conventionally used a principle that since the outer diameter of a tire (the dynamic load radius of a tire) is reduced more than that of a tire having a normal inner pressure when the pressure of a tire is reduced, wheel speed (rotational angular velocity) is increased as compared with other normal tires. For example, a method of detecting the lowering of an inner pressure from the relative difference of the wheel speeds of a tire uses as a judgment value;

$$DEL=\{(V1+V4)/2-(V2+V3)/2\}/\{(V1+V2+V3+V4)/4\} \times 100 \, (\%)$$

(For example, refer to Japanese Unexamined Patent Publication No. 305011/1988).

Wherein V1 to V4 are the wheel speeds of a front left tire, a front right tire, a rear left tire and a rear right tire, respectively.

By the way, a judgment value being the above-mentioned relative comparison value of tire property which is determined from the relative difference of the wheel speeds of tires varies a little depending on the various traveling conditions of a vehicle.

Accordingly, in a conventional detection device of decompression of tires, an average value obtained by moving average of the relative comparison value (judgment value) obtained by the measurement for a fixed time, for example, for continuous six seconds and the like is used, and decompression of tires is designed to be detected by a result whether its average value exceeds a fixed threshold or not.

However, when the above-mentioned average value is used, the judgment value is calculated, for example, by every one second, the moving average value for 6 seconds of the judgment value is determined and its average value is compared with a threshold. However, a chance for calculating the judgment value for at least continuous 6 seconds must be obtained in order to calculate the moving average value for 6 seconds, and if the judgment value exceeding the threshold is not obtained for 6 seconds, the moving average value does not exceeds the threshold.

When traveling which is terminated for less than 6 seconds after actuation is repeated in like manner as, for example, cars are on a traffic jammed highway, there is no chance for calculating the moving average value even if the judgment value exceeds the threshold; therefore there is a problem that decompression of tires cannot be detected nevertheless the pressures of tires are reduced.

SUMMARY OF THE INVENTION

Under the above-described circumstances, an object of the present invention is to provide the method for detecting decompression of tires which can detect decompression of tires even if the traveling of a vehicle is repeated for a short time and a device thereof, and a program for judging decompression of tires.

The method for detecting decompression of tires based on the rotational speed of wheels mounted on a vehicle of the present invention is characterized by comprising the steps of: detecting the rotational speed of each of the wheels; storing the rotational speed of wheels; determining a judgment value of decompression of tires by using the relative comparison of the rotational speed; storing the judgment value in a non-volatile memory; determining an average value obtained by a moving average of a certain number of the judgment value; and judging decompression of tires by comparing the average value with a threshold.

Further, the detection device for detecting decompression of tires based on the rotational speed of wheels mounted on a vehicle of the present invention is characterized by comprising: a means for detecting the rotational speed of each of the wheels; a means for storing the rotational speed; a means for calculating the judgment value of decompression of tires by using the relative comparison of the rotational speed, a non-volatile memory for storing the judgment value; a means for determining the average value obtained by a moving average of a certain number of the judgment values; and a means for judging decompression of tires by comparing the average value with a threshold.

The judgment program of decompression of tires based on the rotational speed of wheels mounted on a vehicle of the present invention is characterized by comprising: a means for storing the rotational speed of wheels mounted on a vehicle; a means for calculating the judgment value of decompression of tires by using the relative comparison of the rotational speed; a means for storing the judgment value in non-volatile memory; a means for determining a moving average of a certain number of the judgment values; and a means for judging decompression of tires by comparing the average value with a threshold.

In the present invention, the judgment value can be ment by DEL, for instance, which is indicated as follows:

$$DEL=\{(V1+V4)/2-(V2+V3)/2\}/\{(V1+V2+V3+V4)/4\} \times 100 \, (\%)$$

Wherein V1 to V4 are the wheel speeds of a front left tire, a front right tire, a rear left tire and a rear right tire, respectively.

According to the present invention, decompression of tires can be detected even if the traveling of a vehicle is repeated for a short time and the chance of judging the reduced pressure of tires is magnified to be able to enhance the safety of vehicle traveling.

DETAILED DESCRIPTION

The method for detecting decompression of tires of the present invention and a device thereof, and a program for judging decompression of tires are illustrated below based on the attached drawings.

Figure 1:
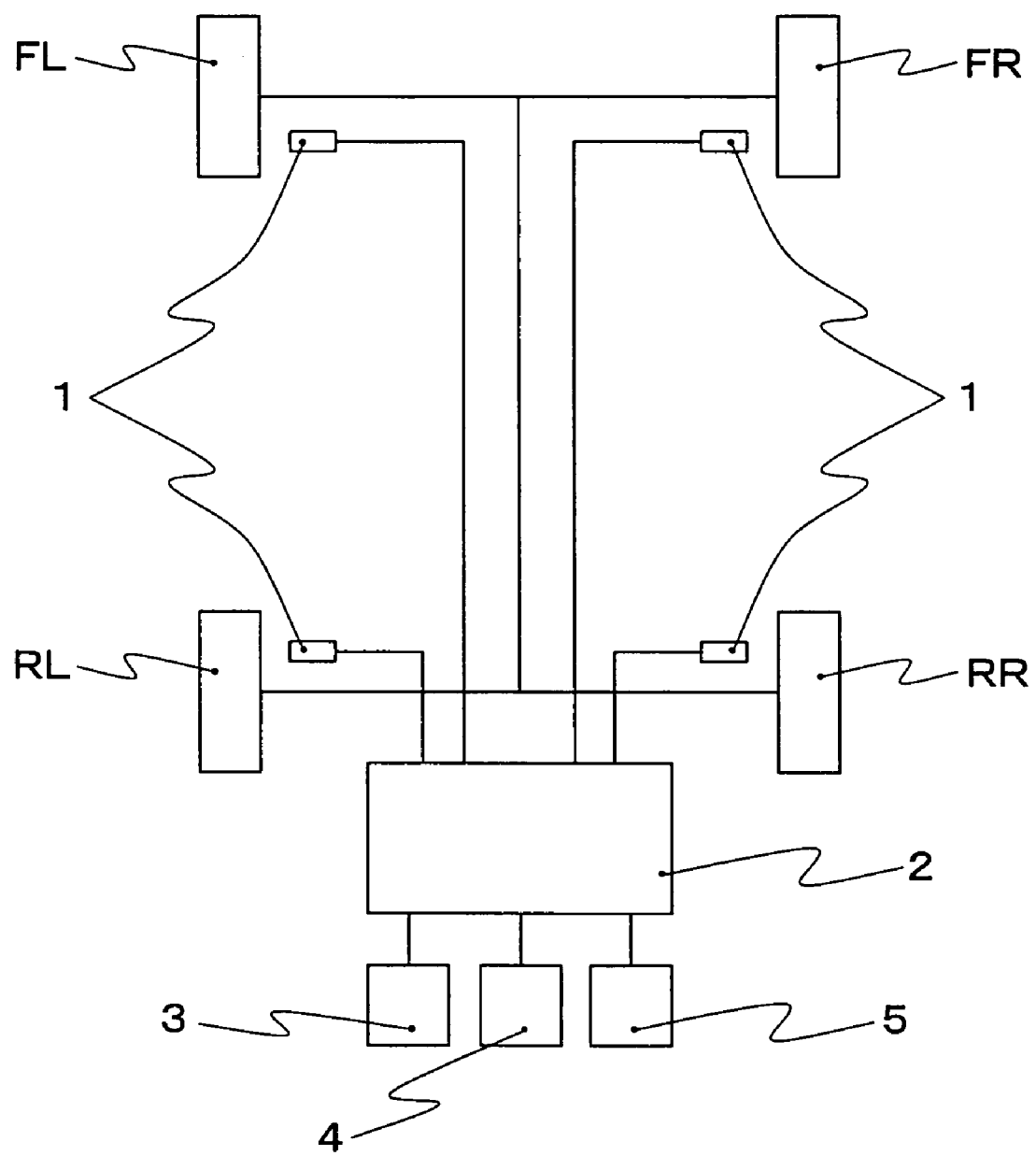
FIG. 1 is a block diagram showing the detection device of detecting decompression of tires related to an embodiment of the present invention.

As shown in FIG. 1, the detection device for decompression of tires related to an embodiment of the present invention detects whether the air pressures of four tires, FL, FR, RL and RR which were provided on a vehicle are lowered or not, and is equipped with a usual rotational speed detecting means 1 which was provided being respectively related with tires.

As the above-mentioned rotational speed detecting means 1, a wheel speed sensor for generating rotary pulses using an electromagnetic pickup and the like and measuring a rotational angular velocity and wheel speeds from the number of pulses, or an angular velocity sensor including those for generating power utilizing rotation such as a dynamo and measuring a rotational angular velocity and wheel speeds from the voltage, or the like can be used. The output of the above-mentioned rotational speed detecting means 1 is provided to the control unit 2 which is a computer such as ABS (Anti-lock Braking System). A display 3 which is constituted by a liquid crystal display, a plasma display device or a CRT for informing a tire decompressed, an initialization switch 4 which can be operated by a driver, and an alarming device 5 are connected with the control unit 2.

Figure 2:
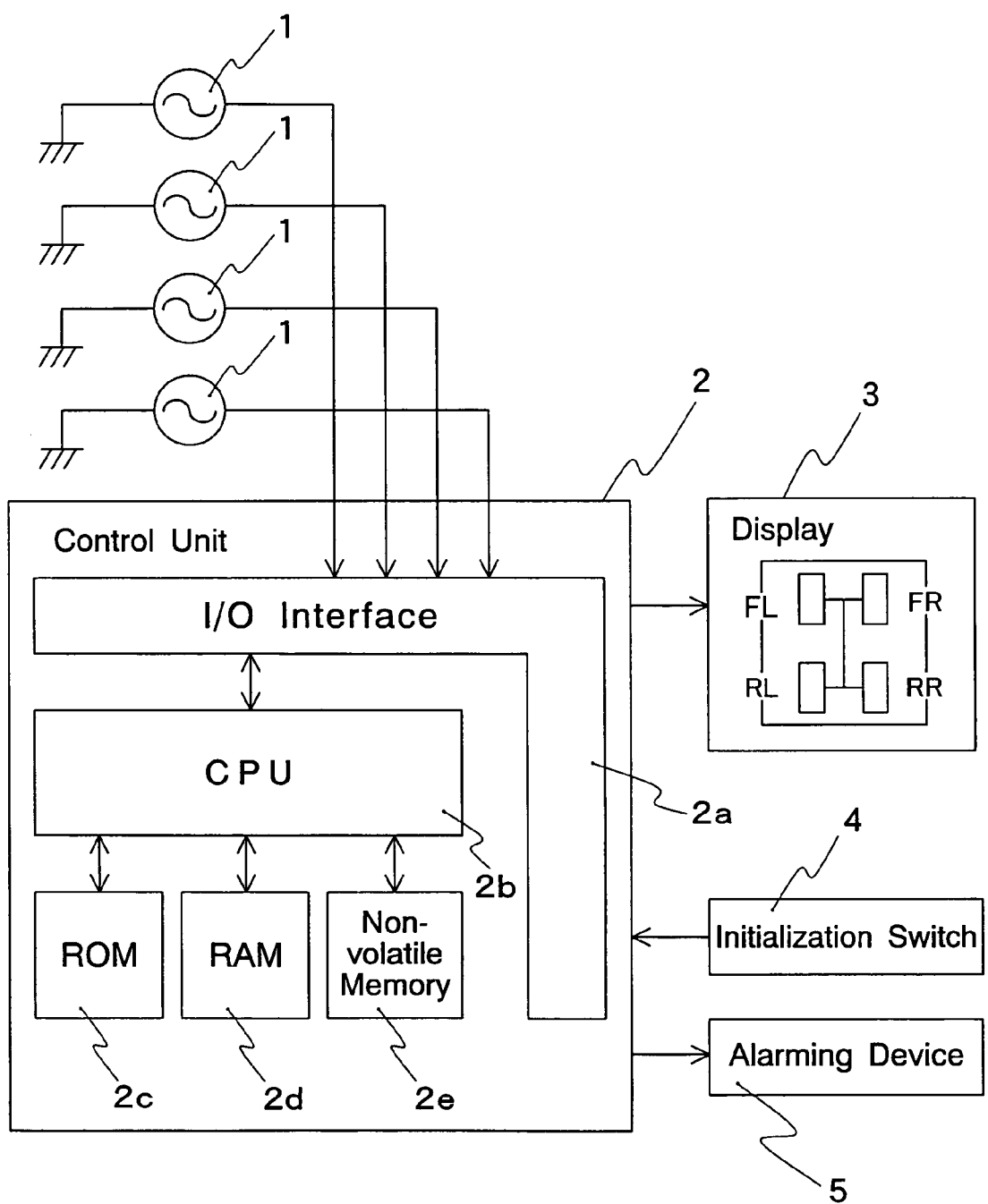
FIG. 2 is a block diagram showing the electric constitution of the detection device of detecting decompression of tires of FIG. 1.

As shown in FIG. 2, the above-mentioned control unit 2 is composed of an I/O interface 2a which is necessary for transferring signals with external devices, a CPU 2b functioning as the center of processing, a ROM 2c in which the control operation program of CPU 2b was stored, and a RAM 2d in which data are temporarily downloaded and the downloaded data and the like are read out when the above-mentioned CPU 2b implements control operation. Further, the control unit 2 is a non-volatile memory 2e in which a judgment value described later is stored.

The above-mentioned rotational speed detecting means 1 outputs pulse signals (hereinafter, referred to as wheel speed pulses) corresponding to the rotation numbers of tires. Further, CPU 2b calculates the rotational angular velocities, Fi, of the respective tires by every fixed sampling cycle, $\Delta T$ (sec), for example, by every $\Delta T=1$ second, based on the wheel speed pulses which were output from the rotational speed detecting means 1.

By the way, since tires are produced including unevenness (initial difference) within specification, the effective rolling radii (a value obtained by dividing a distance proceeded by one rotation, by $2\pi$) of respective tires are not always the same even if all tires have normal air pressure. Accordingly, the rotational angular velocities, Fi of respective tires come to be uneven. Therefore, for example, there is a method of excluding the influence of initial difference from the rotational angular velocities, Fi. Firstly, the method calculates initial correction coefficients K1, K2 and K3 which are shown as follow.

$$K1 = F1/F2 \tag{1}$$

$$K2 = F3/F4 \tag{2}$$

$$K3 = (F1 + K1 \times F2)/(F2 + K2 \times F4) \tag{3}$$

Subsequently, new rotational angular velocities, $F1_i$ are determined using the initial correction coefficients K1, K2 and K3 which were thus calculated, as shown in the equations (4) to (7).

$$F1_1 = F1 \tag{4}$$

$$F1_2 = K1 \times F2 \tag{5}$$

$$F1_3 = K3 \times F3 \tag{6}$$

$$F1_4 = K2 \times K3 \times F4 \tag{7}$$

Wherein the initial correction coefficient, K1, is a coefficient for correcting the difference of effective rolling radius which is caused by the initial difference between left and right front tires. The initial correction coefficient, K2, is a coefficient for correcting the difference of effective rolling radius caused by the initial difference between left and right rear tires. The initial correction coefficient, K3, is a coefficient for correcting the difference of effective rolling radius caused by the initial difference between a left front tire and a left rear tire. Then, the wheel speed of a tire of each of wheels, Vi is calculated by using the above-mentioned $F1_i$.

In the detection device for detecting decompression of tires related to the Embodiment, as shown in the following equation (8), as the judgment value DEL for detecting decompression which uses the relative comparison value of tire property, the total of signals from a pair of another wheels on diagonal is subtracted from the total of signals from a pair of wheels on a diagonal, and the ratio of the result to the average value of the total of two is used.

$$DEL = \{(V1+V4)/2 - (V2+V3)/2\}/\{(V1+V2+V3+V4)/4\} \times 100\ (\%) \tag{8}$$

Wherein V1 to V4 are the wheel speeds of a front left tire, a front right tire, a rear left tire and a rear right tire, respectively.

Further, the detection device of detecting decompression of tires related to the Embodiment is composed of the speed detecting means 1, a RAM 2d being a means of storing the wheel rotational speed, a means of calculating the judgment value of decompression of tires by using the relative comparison of the wheel rotational speed information, a non-volatile memory 2e of storing the judgment value obtained, a means of determining the average value obtained by a moving average of a certain number of the judgment values and a means of judging decompression of tires by comparing the average value with a threshold. The above-mentioned CPU 2b comprises the above-mentioned means of calculating the judgment value, the means of determining the average value and the means of judging decompression of tires.

The method for detecting decompression of tires of the present invention and the device thereof store the judgment value calculated according to, for example, the above-mentioned equation (8), in the non-volatile memory, and determines the moving average value by summing the judgment value obtained at traveling before stoppage even if the traveling was stopped and the judgment value calculated at the next traveling.

Specifically, in a conventional method, for example, when the moving average value for 6 seconds is determined (the judgment value is assumed to be determined by every one second), the six judgment values are required; therefore the moving average value for 6 seconds cannot be determined until the fifth second after actuation as shown in Table 1. It means that when the traveling which is stopped at 5 seconds after actuation is repeated, the comparison of the moving average value for 5 seconds with a threshold for judging the detection of decompression cannot be implemented.

TABLE 1

| | First D | Last D | D two seconds old | D three seconds old | D four seconds old | D five seconds old | Moving average value for 6 seconds |
|---|---|---|---|---|---|---|---|
| First second from actuation | D1 | | | | | | |
| Second sec. | D2 | D1 | | | | | |
| Third sec. | D3 | D2 | D1 | | | | |
| Fourth sec. | D4 | D3 | D2 | D1 | | | |
| Fifth sec. | D5 | D4 | D3 | D2 | D1 | | |
| Sixth sec. | D6 | D5 | D4 | D3 | D2 | D1 | (D1 + ... + D6)/6 |
| Seventh sec. | D7 | D6 | D5 | D4 | D3 | D2 | (D2 + ... + D7)/6 |
| Eighth sec. | D8 | D7 | D6 | D5 | D4 | D3 | (D3 + ... + D8)/6 |

To the contrary, the present invention of the application stores the judgment value obtained at traveling in the non-volatile memory and utilizes again the above-mentioned judgment value to the judgment of reduced pressure at next actuation even if the moving average value cannot be calculated at traveling.

For example, a case that the traveling which is terminated at 4 seconds after actuation is repeated is shown in Table 2 (the judgment value is calculated by every second).

TABLE 2

| | First | Last | Two seconds old | Three seconds old | Four seconds old | Five seconds old | Moving average value for 6 seconds |
|---|---|---|---|---|---|---|---|
| First second from actuation | D1 | C4 | C3 | C2 | C1 | B4 | (D1 + C4 + C3 + C2 + C1 + B4)/6 |
| Second sec. | D2 | D1 | C4 | C3 | C2 | C1 | (D2 + D1 + C4 + C3 + C2 + C1)/6 |
| Third sec. | D3 | D2 | D1 | C4 | C3 | C2 | (D3 + D2 + D1 + C4 + C3 + C2)/6 |
| Fourth sec. | D4 | D3 | D2 | D1 | C4 | C3 | (D4 + D3 + D2 + D1 + C4 + C3)/6 |

In this case, since the moving average value for six seconds can be obtained at the first second from the initiation of the traveling on and after the second sec. at the second traveling, the judgment of decompression can be implemented. In Table 2, Cn (n is an integer) is the judgment value which was obtained at the last actuation, stored in the non-volatile memory and utilized again at this time, and Bn (n is an integer) is the judgment value which was obtained before the last actuation, stored in the non volatile memory and utilized again at this time.

Further, in the Embodiment, the value represented by the above-mentioned equation (8) is used as the judgment value of the detection of decompression, but in addition to this, for example, V1/V2 and V3/V4 can be used (V1 to V4 are the wheel speeds of a front left tire, a front right tire, a rear left tire and a rear right tire, respectively). Further, the calculation interval of the judgment value is set as one second, and the moving average value is determined by the six judgment values, but the judgment value is not limited to these, and suitable times and number can be adopted.

According to the present invention, decompression of tires can be detected even if the traveling of a vehicle is repeated for a short time and the chance of judging the reduced pressure of tires is magnified to be able to enhance the safety of vehicle traveling.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for detecting decompression of tires based on rotational speed of wheels mounted on a vehicle, comprising the steps of:
   detecting rotational speed of each of said wheels;
   storing said rotational speed;
   determining a judgment value of decompression of tires by using a relative comparison of said rotational speed;
   storing the judgment value obtained in a non volatile memory;
   determining an average value obtained by a moving average of a certain number of said judgment values; and
   judging decompression of tires by comparing said average value with a threshold.

2. The method according to claim 1, wherein, if there is a stoppage of the vehicle, said step of determining the average value includes obtaining the moving average by summing judgment values obtained during traveling of the vehicle before stoppage of the vehicle and judgment values obtained during a next traveling of the vehicle to obtain said certain number of the judgment values.

3. The method according to claim 1, wherein said step of determining the average value includes obtaining the moving average by summing judgment values to obtain said certain number of the judgment values without consideration of whether the vehicle has stopped and without consideration of whether a certain period of time has passed.

4. A device for detecting decompression of tires based on rotational speed of wheels mounted on a vehicle, comprising:
   a means for detecting rotational speed of each of said wheels;
   a means for storing said rotational speed;

a means for calculating a judgment value of decompression of tires by using a relative comparison of said rotational speed;

a non-volatile memory for storing said judgment value;

a means for determining a moving average of a set number of said judgment values; and a means for judging decompression of tires by comparing said moving average with a threshold.

5. The device according to claim 4, wherein, if there is a stoppage of the vehicle, said means for determining the moving average obtains the moving average by summing judgment values obtained during traveling of the vehicle before stoppage of the vehicle and judgment values obtained during a next traveling of the vehicle to obtain said set number of the judgment values.

6. The device according to claim 4, wherein said means for determining the moving average obtains the moving average by summing judgment values to obtain said set number of the judgment values without consideration of whether the vehicle has stopped and without consideration of whether a certain period of time has passed.

7. A program embodied on a computer readable medium for judging decompression of tires based on rotational speed of wheels mounted on a vehicle, comprising:

a means for storing said rotational speed of wheels mounted on a vehicle;

a means for calculating the judgment value of decompression of tires by using the relative comparison of said rotational speed;

a means for storing said judgment value in non-volatile memory;

a means for determining a moving average of a set number of said judgment values; and a means for judging decompression of tires by comparing said average value with a threshold.

8. The program according to claim 7, wherein, if there is a stoppage of the vehicle, said means for determining the moving average obtains the moving average by summing judgment values obtained during traveling of the vehicle before stoppage of the vehicle and judgment values obtained during a next traveling of the vehicle to obtain said set number of the judgment values.

9. The program according to claim 7, wherein said means for determining the moving average obtains the moving average by summing judgment values to obtain said set number of the judgment values without consideration of whether the vehicle has stopped and without consideration of whether a certain period of time has passed.

* * * * *